US011006323B2

(12) United States Patent
Kim et al.

(10) Patent No.: US 11,006,323 B2
(45) Date of Patent: May 11, 2021

(54) ELECTRONIC DEVICE AND WLAN RELAY FUNCTION CONTROL METHOD THEREOF

(71) Applicant: Samsung Electronics Co., Ltd., Gyeonggi-do (KR)

(72) Inventors: Hongshik Kim, Gyeonggi-do (KR); Madhan Raj Kanagarathinam, Bangalore (IN); Sungin Kim, Gyeonggi-do (KR); Harikrishnan Natarajan, Bangalore (IN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/429,261

(22) Filed: Jun. 3, 2019

(65) Prior Publication Data
US 2019/0380065 A1  Dec. 12, 2019

(30) Foreign Application Priority Data
Jun. 12, 2018  (KR) .................. 10-2018-0067444

(51) Int. Cl.
| H04W 4/00 | (2018.01) |
| H04W 28/20 | (2009.01) |
| H04W 28/02 | (2009.01) |
| H04L 12/24 | (2006.01) |
| H04B 7/15 | (2006.01) |

(Continued)

(52) U.S. Cl.
CPC ............ *H04W 28/20* (2013.01); *H04B 7/15* (2013.01); *H04L 41/0893* (2013.01); *H04L 47/20* (2013.01); *H04W 28/0221* (2013.01); *H04W 40/22* (2013.01)

(58) Field of Classification Search
CPC . H04W 28/20; H04W 28/0221; H04W 40/22; H04L 41/0893; H04L 47/20; H04L 41/22; H04L 41/0896; H04L 43/0894; H04B 7/15; H04B 7/15528; H04B 7/15557
USPC .................................................. 370/329, 330
See application file for complete search history.

(56) References Cited

U.S. PATENT DOCUMENTS

| 8,804,517 B2 | 8/2014 | Oerton |
| 8,949,439 B1 | 2/2015 | Sahuguet |
| 2009/0129352 A1 | 5/2009 | Verma et al. |

(Continued)

FOREIGN PATENT DOCUMENTS

| EP | 3 193 527 | 7/2017 |
| KR | 1020160009599 | 1/2016 |

OTHER PUBLICATIONS

International Search Report dated Sep. 20, 2019 issued in counterpart application No. PCT/KR2019/006953, 9 pages.

(Continued)

*Primary Examiner* — Chuong T Ho
(74) *Attorney, Agent, or Firm* — The Farrell Law Firm, P.C.

(57) ABSTRACT

An electronic device and a method are provided for wireless local area network (WLAN) relay connection control. A cellular communication connection is established between the electronic device and a network. A WLAN communication connection is established between the electronic device and at least one external device. Policy information related to the WLAN relay function is checked. A bandwidth of at least one of the electronic device and the at least one external device is determined based on at least part of the policy information.

19 Claims, 13 Drawing Sheets

(51) Int. Cl.
*H04L 12/813* (2013.01)
*H04W 40/22* (2009.01)

(56) References Cited

U.S. PATENT DOCUMENTS

| | | |
|---|---|---|
| 2011/0294502 A1 | 12/2011 | Oerton |
| 2012/0240197 A1 | 9/2012 | Tran et al. |
| 2013/0107783 A1 | 5/2013 | Shaw |
| 2014/0092731 A1* | 4/2014 | Gupta ............... H04L 65/60 370/229 |
| 2014/0254499 A1 | 9/2014 | Hassan et al. |
| 2014/0337923 A1 | 11/2014 | Anders et al. |
| 2014/0369332 A1* | 12/2014 | Seo .................. H04W 84/12 370/338 |
| 2015/0288529 A1* | 10/2015 | Kekki ............... H04W 48/18 370/259 |
| 2016/0080921 A1 | 3/2016 | Yadav et al. |
| 2016/0360410 A1 | 12/2016 | Obaidi et al. |
| 2017/0048739 A1* | 2/2017 | Jeong ............... H04W 48/18 |
| 2018/0220325 A1* | 8/2018 | Lee .................. H04W 72/10 |
| 2019/0349453 A1* | 11/2019 | Phillips .......... H04N 21/25858 |
| 2020/0403690 A1* | 12/2020 | Stauffer ........... H04B 7/0805 |

OTHER PUBLICATIONS

[Traffic Manager] How to control transmission speed of client device via Bandwidth Limiter?, https://www.asus.com/support/faq/1016525, Jun. 14, 2016, pp. 7.

European Search Report dated Mar. 30, 2021 issued in counterpart application No. 19820316.8-1216, 9 pages.

* cited by examiner

ELECTRONIC DEVICE AND WLAN RELAY FUNCTION CONTROL METHOD THEREOF

CROSS-REFERENCE TO RELATED APPLICATIONS

This application is based on and claims priority under 35 U.S.C. § 119(a) to Korean Patent Application No. 10-2018-0067444 filed on Jun. 12, 2018, in the Korean Intellectual Property Office, the disclosure of which is incorporated herein by reference in their entirety.

BACKGROUND

1. Field

The disclosure relates generally to an electronic device and, more particularly, to an electronic device equipped with a wireless local area network (WLAN) relay function (or hotspot function) for relaying data of other devices.

2. Description of Related Art

Electronic devices including smartphones may be equipped with a mobile hotspot function (soft access point (AP) or WLAN relay). Typically, the mobile hotspot function of an electronic device with cellular communication capability enables the electronic device to act as an AP of a WLAN or wireless fidelity (Wi-Fi) network such that other electronic devices on the WLAN are able to connect to an external network via a cellular system.

Once the other electronic device connects to the electronic device with the hotspot function, data of both the hotspot client device and the hotspot host device can be transmitted to (or received from) external networks via cellular communication.

The hotspot function may reduce a bandwidth available for the hotspot host device to transmit/receive all data of the hotspot host device and the hotspot client device. Although it may be possible to control hotspot access by setting a service set identifier (SSID) and a password, data usages and data rates of the hotspot host device and hotspot client devices cannot be guaranteed.

SUMMARY

An aspect of the disclosure provides an electronic device having a mobile hotspot function and hotspot access control method thereof, which is capable of guaranteeing data usages and data rates of both a mobile hotspot host device and mobile hotspot client devices connected to the mobile hotspot host device.

According to an embodiment, an electronic device is provided. The electronic device includes at least one communication circuit supporting WLAN communication and cellular communication and a processor functionally connected to the at least one communication circuit.

The processor is configured to establish a cellular communication connection between the electronic device and a network, establish a WLAN communication connection between the electronic device and at least one external device via a WLAN relay function of the electronic device, check for policy information related to the WLAN relay function, and determine a bandwidth of at least one of the electronic device and the at least one external device based on at least part of the policy information.

According to another embodiment, a WLAN relay connection control method of an electronic device is provided. A cellular communication connection is established between the electronic device and a network. A WLAN communication connection is established between the electronic device and at least one external device. Policy information related to the WLAN relay function is checked. A bandwidth of at least one of the electronic device and the at least one external device is determined based on at least part of the policy information.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1:
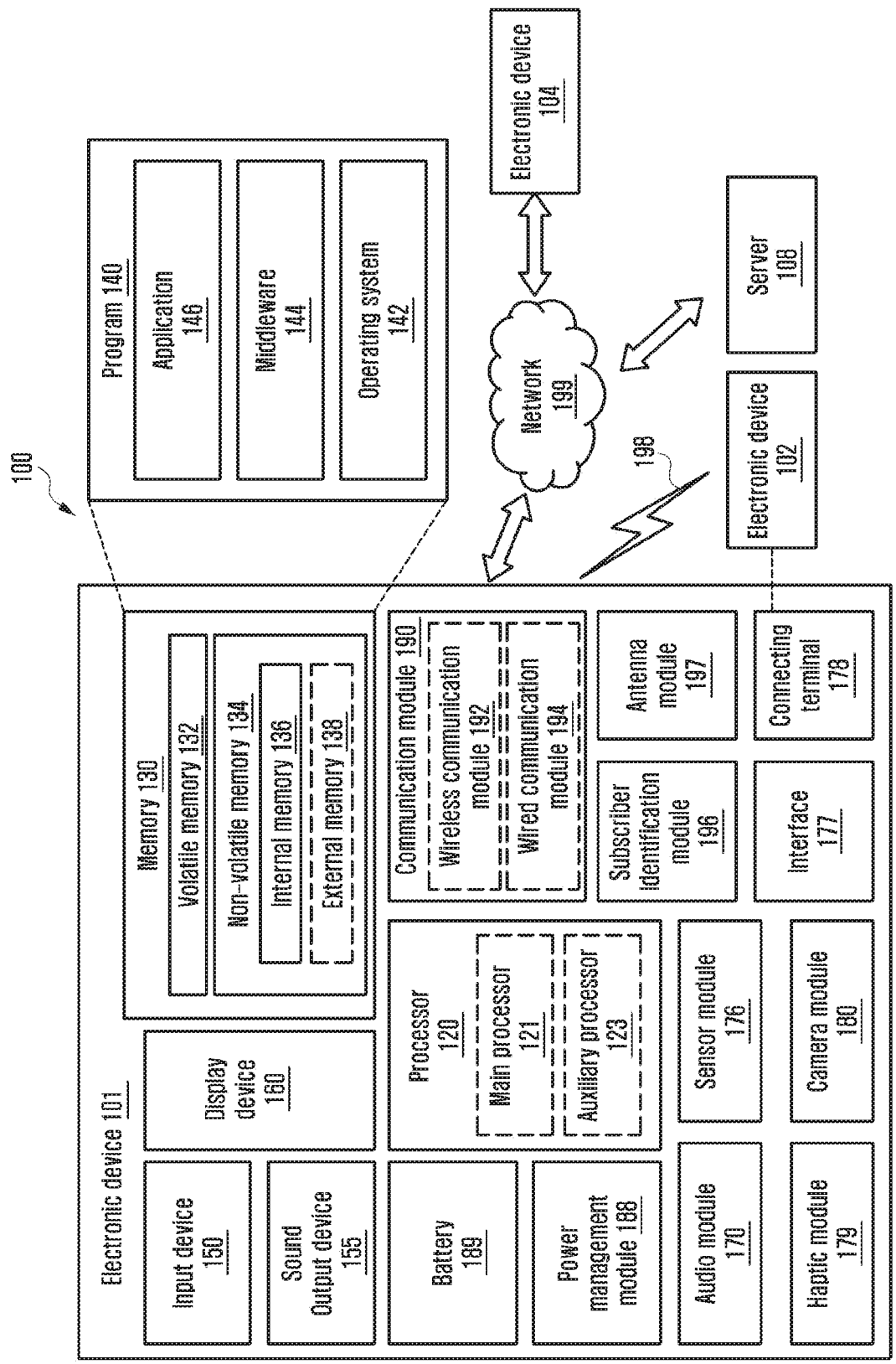
FIG. 1 is a block diagram illustrating a configuration of an electronic device in a network environment, according to an embodiment.

Embodiments of the disclosure are described in detail below with reference to the attached drawings. The same or similar components may be designated by the same or similar reference numerals although they are illustrated in different drawings. Detailed descriptions of constructions or processes known in the art may be omitted to avoid obscuring the subject matter of the present disclosure.

FIG. 1 is a block diagram illustrating an electronic device 101 in a network environment 100, according to an embodiment. The electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. At least one of the components (e.g., the display device 160 or the camera module 180) may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)) and an auxiliary processor 123 (e.g., a graphics processing unit (GPU), an image signal processor (ISP), a sensor hub processor, or a communication processor (CP)), which is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display device 160, the sensor module 176, or the communication module 190) among the components of the electronic device 101, instead of the main processor 121, while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data items used by at least one component (e.g., the processor 120 or the sensor module 176) of the electronic device 101. The various data items may include, for example, software (e.g., the program 140) and input data or output data for a command related thereto. The memory 130 includes the volatile memory 132 and the non-volatile memory 134.

The program 140 may be stored in the memory 130 as software, and includes, for example, an operating system (OS) 142, middleware 144, and an application 146.

The input device 150 may receive a command or data to be used by other components (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia, and the receiver may be used for incoming calls. The receiver may be implemented as separate from, or as part of, the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include, for example, a HDMI connector, a USB connector, an SD card connector, or an audio connector (e.g., a headphone connector), The haptic module 179 may convert an electrical signal into a mechanical stimulus (e.g., a vibration or a movement) or electrical stimulus that may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or they may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. The antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted to or received from the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of the same type as or a different type from the electronic device 101. All or some of the operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing of any such function or service to the electronic device 101. The electronic device 101 may provide the outcome, with or without further processing of the outcome, as at least part of a reply to the request. To that end, a cloud computing, distributed computing, or client-server computing technology may be used, for example.

The electronic device, according to various embodiments, may be one of various types of electronic devices. The electronic devices may include, for example, a portable communication device (e.g., a smart phone), a computer device, a portable multimedia device, a portable medical device, a camera, a wearable device, or a home appliance. The electronic devices are not limited to those described above.

Various embodiments of the present disclosure and the terms used herein are not intended to limit the technological features set forth herein to particular embodiments, and may include various changes, equivalents, or replacements for a corresponding embodiment. With regard to the description of the drawings, similar reference numerals may be used to refer to similar or related elements. A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include all possible combinations of the items enumerated together in a corresponding one of the phrases. As used herein, such terms as "1st" and "$2^{nd}$", or "first" and "second" may be used to simply distinguish a corresponding component from another, and do not limit the components in other aspects (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an ASIC.

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or may be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as a memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or a similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
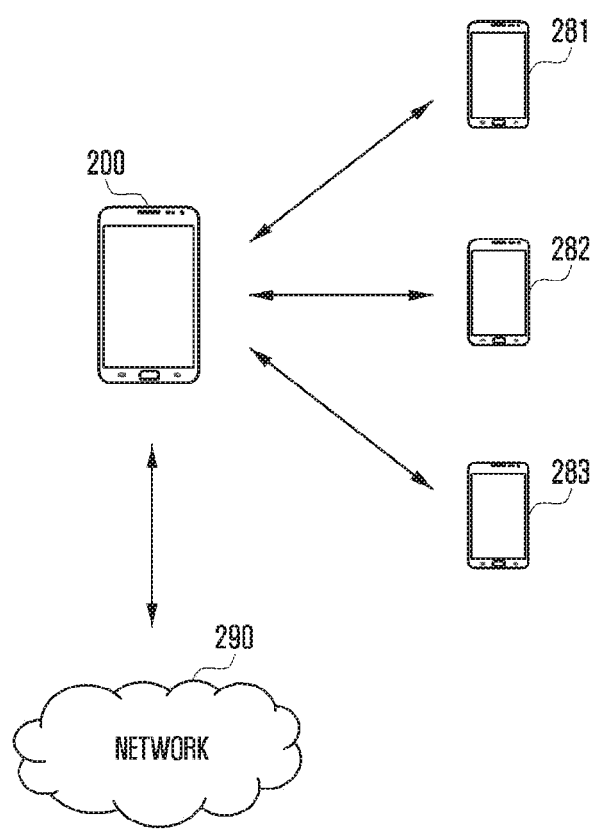
FIG. 2 is a diagram illustrating an electronic device and external electronic devices relayed by the electronic device via a WLAN relay function, according to an embodiment.

FIG. 2 is a diagram illustrating an electronic device and external electronic devices relayed by the electronic device via a WLAN relay function, according to an embodiment.

An electronic device 200 may be equipped with a WLAN relay function (or hotspot or soft AP function). The WLAN relay function makes it possible for at least one of external electronic devices 281, 282, and 283 to access a network 290 via the electronic device 200 that is capable of connecting to the network 290. The electronic device 200, which is acting as an AP with its WLAN relay function for providing a network access service, may be referred to as a service device, and the devices 281, 282, and 283 that connect to the network 290 via the service device may be referred to as client devices.

The electronic device (or service device) 200 may access the network 290 via cellular communication. A cellular communication service is provided by a mobile communication operator using various mobile communication protocols including, but not limited to, long term evolution (LTE), LTE-Advanced (LTE-A), code division multiple access (CDMA), wideband CDMA (WCDMA), Universal Mobile Telecommunications System (UMTS), Wireless Broadband (WiBro), and Global System for Mobile communications (GSM). The electronic device 200 may access the network 290 (e.g., public data network (PDN)) through cellular communication with a base station and may relay data to and from various devices on the network 290.

The electronic device and at least one of the external devices (or client devices) 281, 282, and 283 may communicate through WLAN communication. Wi-Fi is a specific example of WLAN, and the WLAN may be replaced by any type of short range communication network. At least one of the external devices 281, 282, and 283 may be identical in type with the electronic device 200 (e.g., smartphone and tablet personal computer (PC)) or different from the electronic device 200 and having a WLAN function (e.g., laptop PC and smart TV).

Figure 3:
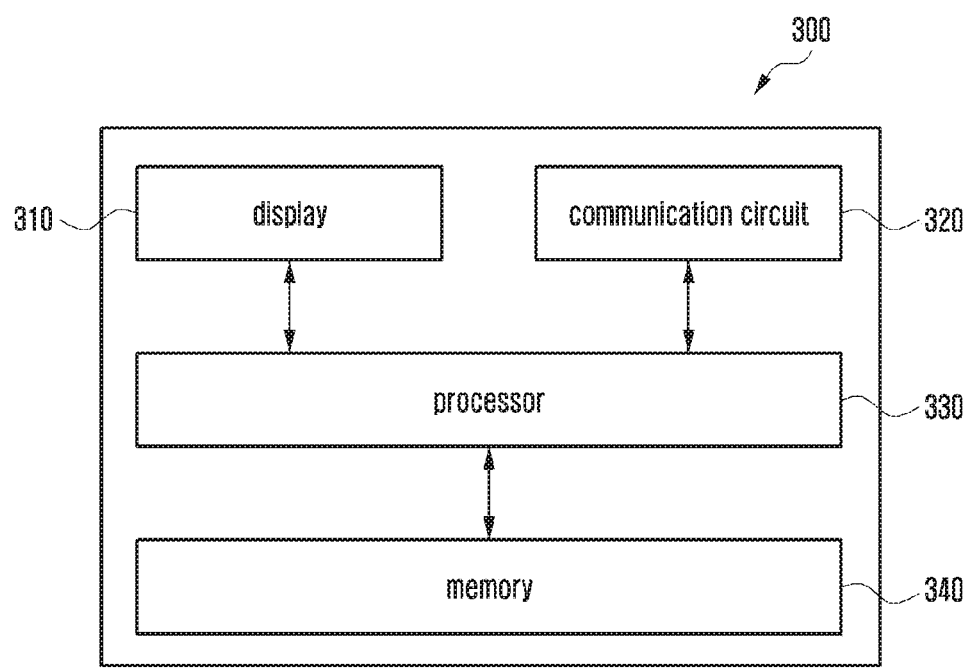
FIG. 3 is a block diagram illustrating a configuration of an electronic device, according to an embodiment.

FIG. 3 is a block diagram illustrating a configuration of an electronic device, according to an embodiment.

An electronic device 300 includes a display 310, a communication circuit 320, a processor 330, and a memory 340. The electronic device 300 may include at least some of the configuration and/or functionality of the electronic device 101 of FIG. 1.

The display 310 displays images and may be implemented with, but is not limited to, a liquid crystal display (LCD), a light-emitting diodes (LED) display, an organic LED (OLED) display, a micro-electro-mechanical systems (MEMS) display, or an electronic paper display. The display 310 may include at least part of the configuration and/or functionality of the display device 160 of FIG. 1.

The display 310 is configured to display various GUIs for supporting WLAN relay function settings, by way of example, without any limit in type of image. Examples of the GUIs are described in greater detail below with reference to FIGS. 7A, 7B, and 9.

The communication circuit 320 includes a software and/or hardware module (e.g., a CP) for wireless communication with a network or an external device, and may include at least part of the configuration and/or functionality of the wireless communication module 192 of FIG. 1. The communication circuit 320 may include a first communication circuit for supporting cellular communication (e.g., LTE communication) and a second communication circuit for supporting WLAN communication (e.g., Wi-Fi communication). The first and second communication circuits may be implemented as separate circuitries (e.g., system on chip (SoQ) or a single circuitry. The communication circuit 320 may send data received from the processor 330 to external devices (e.g., network 290 or at least one of external devices 281, 282, and 283 of FIG. 2) or data received from the external devices to the processor 330.

The processor 330 is configured to control the components of the electronic device 300 and perform communication-related operations and data processing, and may include at least part of the configuration of the processor 120 of FIG. 1. The processor 330 may be operatively, electrically, and/or functionally connected with the internal components of the electronic device 300, such as the communication circuit 320 and the memory 340.

The memory 340 stores data including, but not limited to, digital data, temporarily or semi-persistently, and may include at least part of the configuration of the memory 130 of FIG. 1. The memory 340 may include a volatile memory and a non-volatile memory. The non-volatile memory may include at least one of a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., NAND flash and ROR flash), a hard drive, or a solid state drive (SSD); the volatile memory may include at least one of dynamic random access memory (DRAM) or synchronous dynamic RAM (SDRAM).

The memory 340 may store various instructions executable by the processor 330. The instructions may include control commands for arithmetical and logical operations, data transfer, and input/output that are recognizable by the processor 330 and may be defined on a framework stored therein. The memory 340 may also store at least part of the programs 140 of FIG. 1.

Although the processor 330 can be implemented without any limitation in operation and data processing functionality in the electronic device, the disclosure is directed to the detailed operations of the processor 330 for determining a data transmission or reception bandwidth at the electronic device 300 or at least one of the external devices, based on at least part of policy information being provided when the WLAN relay function is enabled. The operations of the processor 300, as described in detail below, may be performed by loading the instructions stored in the above-described memory 340.

When a cellular communication function is enabled, the processor 330 may establish a cellular connection with a network by means of the communication circuit 320 (e.g., the first communication circuit). When the WLAN relay function is executed, the processor 330 may establish a WLAN connection with at least one of the external devices by means of the communication circuit 320. The WLAN relay function may be executed according to a signal input by a user through a GUI.

If the electronic device 300 is connected to at least one electronic device via the WLAN relay function, the processor 330 may receive data from the at least one external device through WLAN communication and transmit the received data to the network through cellular communication. The processor 330 may also transmit data received from the network to the at least one external device.

The processor 330 may check the policy information for the WLAN relay function and determine a data transmission or reception bandwidth for the electronic device 300 and the at least one external device connected via a hotspot connection based on at least part of the policy information. The policy information may include a priority of at least one of the electronic device 300 or the at least one external device. For example, the policy information may include a priority order of the electronic device 300 and the external devices and a priority order of the external devices. Due to the fact that the cellular communication bandwidth of the electronic device 300 should be shared for the traffic of the electronic device 300 and the traffic of the at least one external device, the processor 330 may determine per-device bandwidths in consideration of the priority of at least one of the electronic device 300 or the at least one external device.

The policy information may be generated according to a user input. For example, the processor 330 may provide a GUI for prioritizing the external device 300 and external devices being connected to the external device 300 via the WLAN relay function, and determine the policy information including priority of at least one of the electronic device 300 or the at least one external device.

Alternatively, the policy information may be stored in the memory 340 at a manufacturing stage of the electronic device, or may be provided by an external server. For example, the policy information may be autonomously configured based on big data, configured according to the policy of the operator (e.g., communication operator) and stored in the memory at the stage of manufacturing the electronic device 300, or provided by an external server.

The processor 330 may determine cellular communication bandwidths to be allocated to the electronic device 300 and the at least one external electronic device based on at least part of the policy information. Cellular communication between the electronic device 300 and the network is performed in a limited bandwidth in which the data to be transmitted from the electronic device 300 and the at least one external device to the network are multiplexed. Accordingly, the electronic device 300 allocates a relatively broad bandwidth for traffic of a device with a high priority to guarantee a quality of service (QoS) of the device with the high priority.

Alternatively, the processor 330 may determine a WLAN communication bandwidth for the at least one external device based on at least part of the policy information. WLAN communication between the electronic device 300 and the at least one external device is also performed in a limited bandwidth in which, if a bandwidth of the external device with a low priority decreases, the data amount to be transmitted from the electronic device 300 to the network also decreases. This means that a relatively low priority data amount to be multiplexed into the cellular communication decreases so as to be able to guarantee the QoS of the other device with a relatively high priority.

The processor 330 may assign the highest priority to the electronic device 300. Unlike a normal router (or AP), the electronic device 300 that is configured to act as a server having a WLAN relay function may access the Internet to use various services. In this respect, if the electronic device 300 and the external device are allocated data transmission resources identical in bandwidth, it may be difficult to expect that the quality of the service in which the user of the electronic device 300 is interested is guaranteed. Thus, it is preferable to configure the policy information such that the electronic device 300 is assigned the highest priority to be able to secure a desired bandwidth.

The processor 330 may determine the policy information based on at least one of a current location or a current time. There may be a necessity of guaranteeing per-device QoS according to conditions such as location and time.

The processor 330 may identify applications related to the data being transmitted by the electronic device 300 and the at least one external device and prioritize the electronic device 300 and the at least one external device according to the priorities of the application based on at least part of the policy information. Applications may differ in desired QoS. For example, if a video streaming application is running on a first external device while a messenger application is running on a second external device, it may be necessary to prioritize the first external device to secure a relatively broad bandwidth for video streaming application data. The processor 330 may allocate different bandwidths for different applications running on the same device according to the priorities of the applications, as described in greater detail below with respect to FIG. 8.

The processor may provide a GUI for receiving input of various WLAN relay function-related configurations via the display 310. For example, the GUI may include a menu for configuring a data rate and a maximum usage amount of an external device connected via a hotspot, a menu for determining a maximum number of external devices allowed for connection, and a menu for determining whether to transmit information on the electronic device 300, such as, for example, location information and battery level, to the external device. Various GUIs related to the WLAN relay function of the electronic device are described in detail with reference to FIGS. 7A, 7B, and 9.

The processor 330 may transmit the information on the electronic device 300 to the external device by means of the communication circuit 320 (e.g., second communication circuit). The processor may provide the external device with the location information of the electronic device 300. Because the electronic device 300 and the external device should be located close to each other for a hotspot connection therebetween, if the external electronic device has no information about its own location, it may locate itself based on the location information of the electronic device 300.

Alternatively, the processor may provide the external device with information on a cellular communication signal strength at the electronic device 300. Although the external device is connected to the electronic device 300 through a WLAN communication link, the data reception of the external device varies depending on the cellular communication signal strength at the electronic device 300, which means that the data rate of traffic for the external device is low if the cellular communication signal strength between the electronic device 300 and the network is low, even though the WLAN communication signal strength between the electronic device 300 and the external device is high. Accordingly, the processor 330 may provide the external device with information on the cellular communication signal strength at the electronic device 300 in order for the external device to display the received information for notifying its user of the current data rate.

The processor 330 may also provide the external device with information on battery status (e.g., battery charging level, temperature, and charging progress) of the electronic device 300. The external device may display the received information in order for the user to determine whether to maintain the hotspot connection to the electronic device 300 and whether to use an application generating excessive data.

The processor 330 may provide the external device with information on security-related functions (e.g., a firewall function, an antivirus function, a malware protection function, a ransomware protection function, a spyware protection function, and spam filters) installed in the electronic device 300. For example, the processor 330 may check data transmitted from the network to the external device for any virus and, if any virus is detected, execute an antiviral function to remove the virus from the data and transmit virus-free data to the external device.

Figure 4:
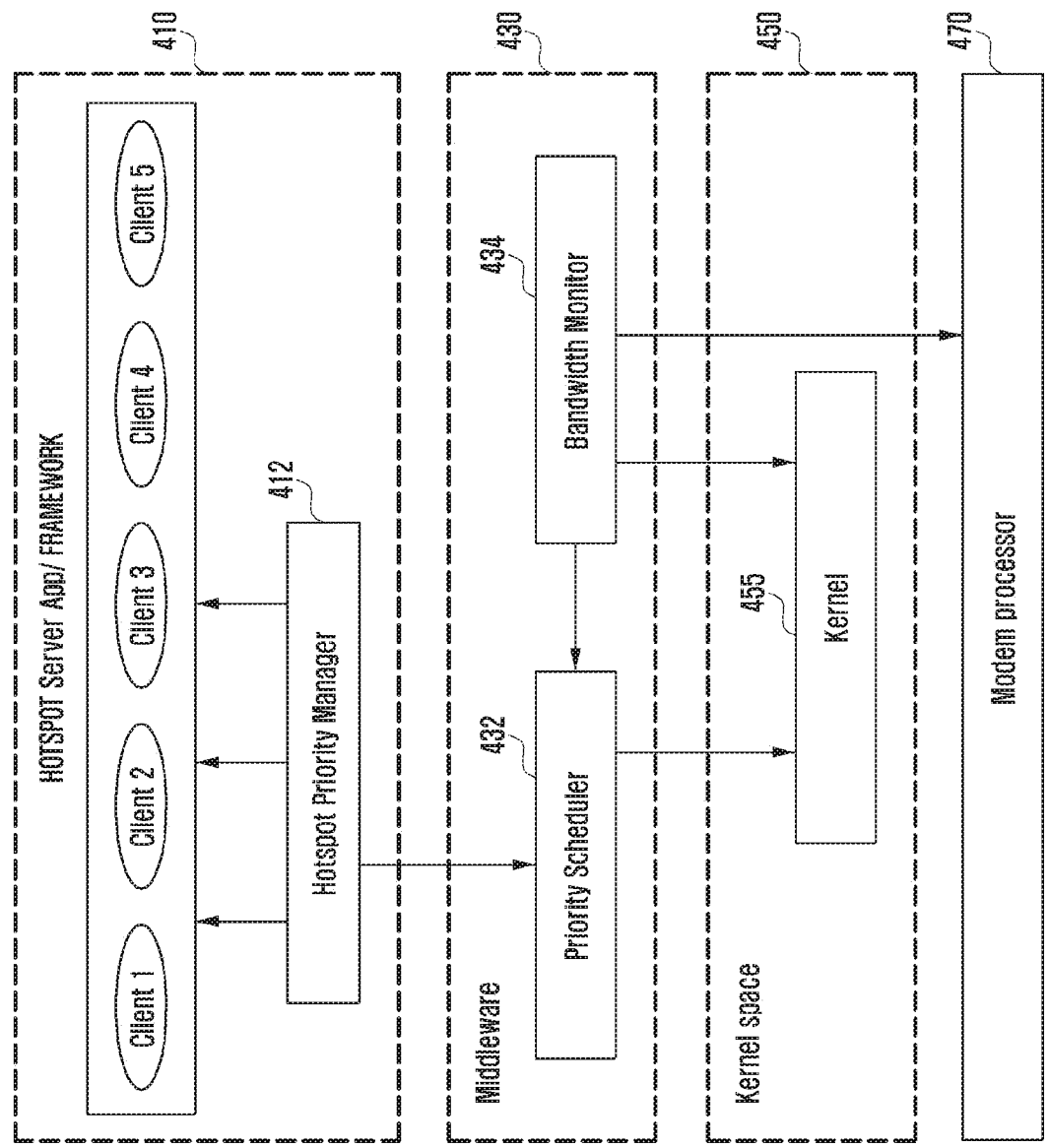
FIG. 4 is a diagram illustrating a software layer of an electronic device having a WLAN relay function, according to an embodiment.

FIG. 4 is a diagram illustrating a software layer of an electronic device having a WLAN relay function, according to an embodiment.

A hotspot application or framework 410 includes a hotspot priority manager 412. The hotspot application or framework 410 may store information on external devices (e.g., client 1, client 2, and client 3) that are currently connected via the WLAN relay function, and information on external devices (e.g., client 4 and client 5) that have been previously connected or requested connection.

The hotspot priority manager 412 may monitor the currently connected external devices (e.g., client 1, client 2, and client 3) to determine whether their priorities change by referencing policy information. If a priority change is detected, the hotspot priority manager 412 may provide a priority scheduler 432 with the corresponding information.

A middleware 430 includes the priority scheduler 432 and a bandwidth monitor 434. The bandwidth monitor 434 may receive information on a real-time bandwidth in view of a communication circuit and bandwidths that are physically supportable by the communication circuit from the communication circuit and provide the priority scheduler 432, a kernel 455, and a modem processor 470 with the corresponding information. The bandwidth monitor 434 may also check for bandwidths in use by the currently connected external devices.

The priority scheduler 432 may calculate bandwidths to be allocated to a respective device according to the priorities of the devices specified in the policy information. For example, if the electronic device has the highest priority, the priority scheduler 432 may calculate a bandwidth necessary for processing traffic for the electronic device, and make a bandwidth allocation determination for the external devices with the remaining bandwidth. The information on per-device bandwidths may be provided to the kernel 455 in a kernel space 450.

The kernel 455 may control the communication circuit to generate per-device traffic based on the information received from the priority scheduler 432.

Figure 5A:
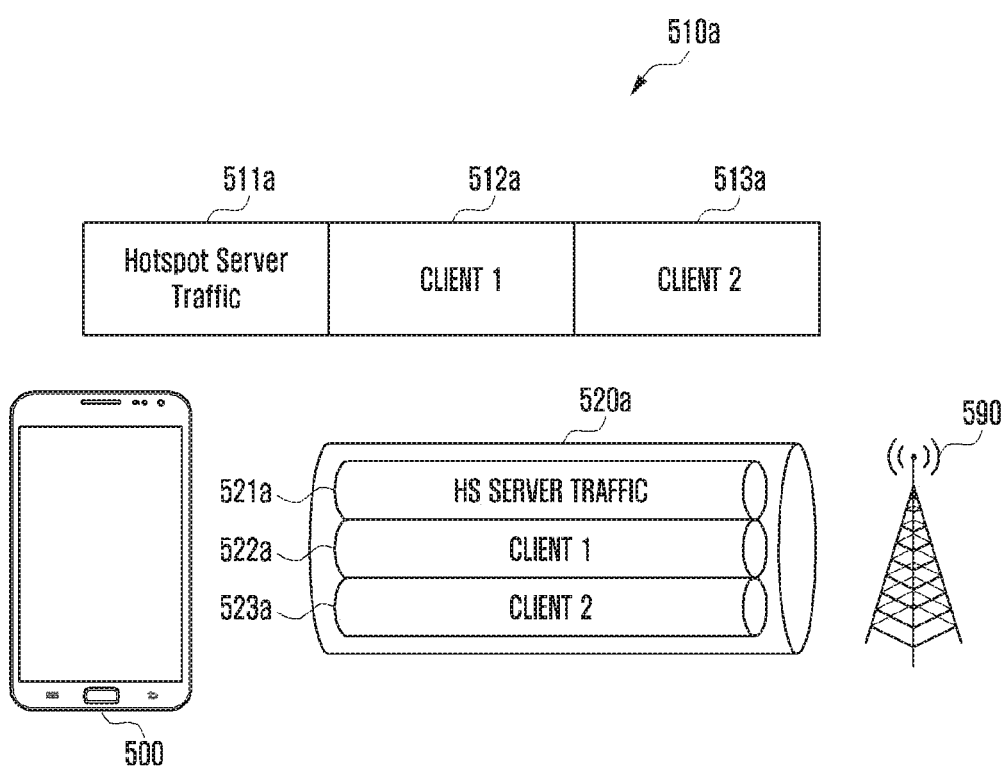
FIG. 5A is a diagram illustrating cellular communication bandwidths for data of an electronic device and external devices, according to an embodiment.
Figure 5B:
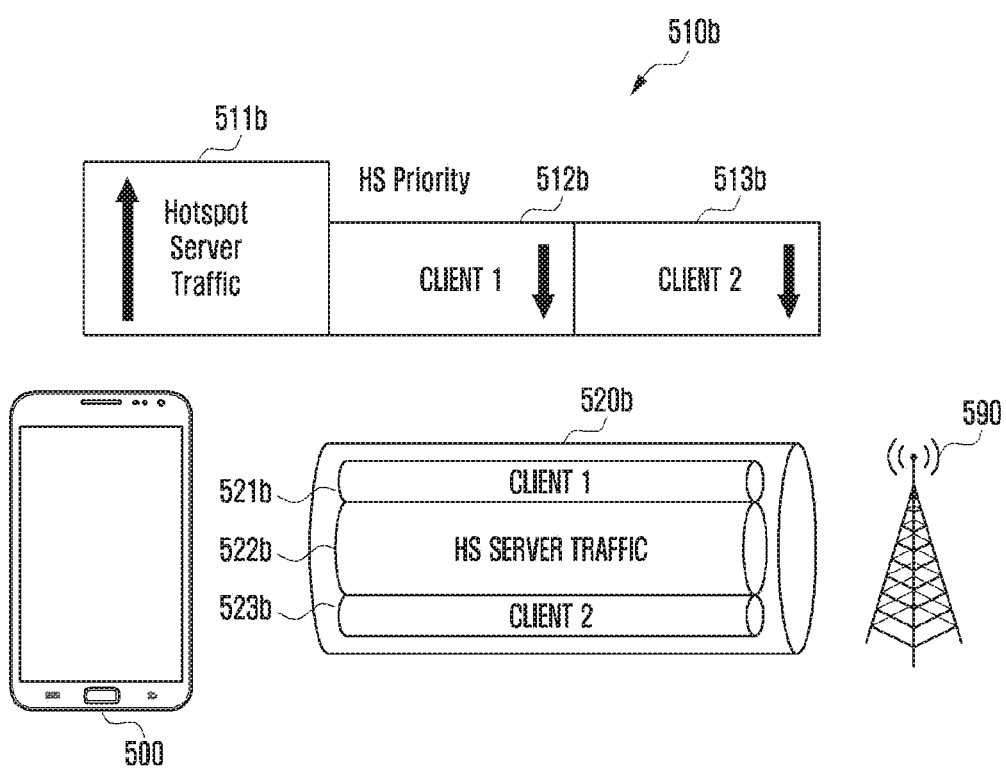
FIG. 5B is a diagram illustrating cellular communication bandwidths for data of an electronic device and external devices, according to an embodiment.

FIGS. 5A and 5B are diagrams illustrating cellular communication bandwidths for data of an electronic device and external devices connected to the electronic device, according to embodiments.

FIGS. 5A and 5B are directed to cases in which two external devices (first and second clients) are connected to the electronic device.

FIG. 5A exemplifies a case where hotspot server traffic 511a of an electronic device 500 and traffic of first and second clients 512a and 513a have the same priority. In this case, the electronic device 500 may allocate, from resources 520a, bandwidths identical in size, to the electronic device and the first and second clients as denoted by reference numbers 521a, 522a, and 523a for communication with a base station 590 of a network.

FIG. 5B exemplifies a case where hotspot server traffic 511b of the electronic device 500 is prioritized over traffic of the first and second clients 512b and 513b. As shown in the drawing, the electronic device with a priority higher than that of the first and second clients is allocated, from resources 520b, a bandwidth 522b broader than that of the first and second clients 521b and 523b for communication with the base station 590 of the network.

When the processor prioritizes the electronic device over the external devices, the device-specific bandwidths may be adjusted according to a current communication situation. For example, if the traffic of the electronic device is causing a bottleneck or if the electronic device should be allocated a relatively broad bandwidth in consideration of application monitoring or data amount being downloaded in the background, it may be possible to adjust the bandwidths allocated to the respective devices.

The processor may be configured to ascertain, if the bandwidth currently allocated to the electronic device is narrower than a minimum bandwidth required for data transmission of the electronic device, an available bandwidth, and reduce, if the available bandwidth is narrower than the bandwidth allocated to the at least one external device, the bandwidth allocated to the at least one external device. Specifically, if the electronic device is assigned a high priority in the policy information, the processor may check for the currently allocated bandwidth ($BW_{SC}$) and the minimum bandwidth required for data transmission of the electronic device ($BW_{sTH}$). If the currently allocated bandwidth ($BW_{SC}$) is narrower than the minimum bandwidth required for data transmission of the electronic device ($BW_{sTH}$), the processor may calculate an additionally allocable bandwidth (allocable_bandwidth) for the electronic device. The additionally allocable bandwidth (allocable_bandwidth) for the electronic device may be calculated as a difference between a currently allocable bandwidth ($BW_A$) and the sum of minimum bandwidths required for data transmissions of respective clients ($\Sum_1^n BWciTH$).

If the additionally allocable bandwidth (allocable_bandwidth) is narrower than the difference between the currently allocable bandwidth ($BW_A$) and the sum of the bandwidths currently allocated to the clients ($\Sum_1^n BWcic$), the processor may reduce the bandwidth allocated to at least one of the current clients ($BW_{cic}$) and increase the bandwidth currently allocated to the electronic device ($BW_{SC}$).

The above-described procedure may be defined with a pseudo code as follows.

```
if (server priority set) {
    // Our algorithm starts if the our current bandwidth is less than the
    minimum threshold bandwidth in the server
    if ( BW_sc < BW_sTH ) {
        // Find the allocable bandwidth first (The total current
        available – Total client threshold bandwidth)
        Allocable_Bandwidth = BW_A – Σ_2^n BW_ciTH
        // if we can allocate this value directly , allocate in single step
        if (Allocable_Bandwidth < BW_A – Σ_1^n BW_cic ) {
            reduce BW_cic by Allocable_Bandwidth
            increase BW_sc by Allocable_Bandwidth
        }
        // if we don't have enough allocable BW, follow gradual
        process
        else {
            // until and unless the client and server socket(s) disturbed
            step by step reduce B_cic and increase BW_sc
        }
    }
}
    If (server priority set) {
        If (BW_SC < BW_sTH) {
            Allocable_Bandwidth = BW_A – Σ_1^n BWciTH
            If (Allocable_Bandwidth < BW_A – Σ_1^n BWcic) {
                Reduce BW_cic by Allocable_Bandwidth
                Increase BW_sc by Allocable_Bandwidth
            }
        Else {
            Step by step reduce BW_cic and increase BW_sc
        } } }
```

Figure 6:
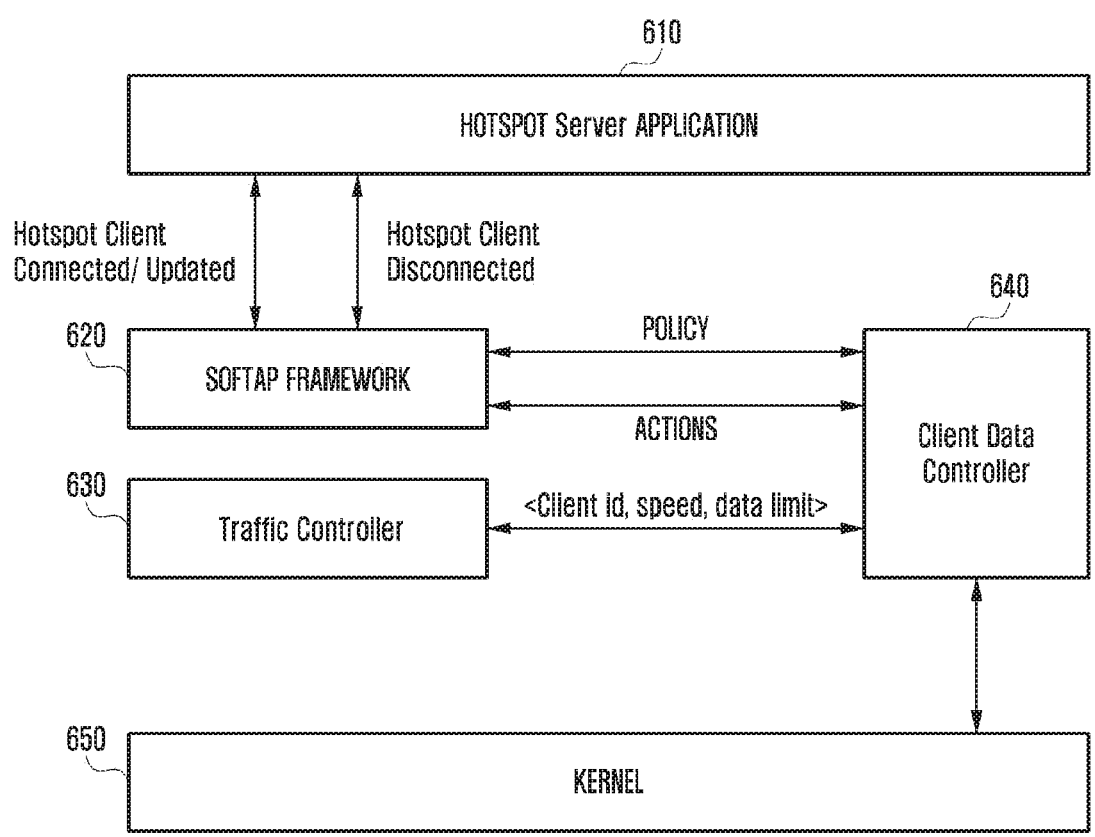
FIG. 6 is a diagram illustrating a framework for controlling data use of external devices, according to an embodiment.

FIG. 6 is a diagram illustrating a framework for controlling data use of external devices, according to an embodiment.

If there is an establishment of a new connection with an external device, a release of an existing connection with an external device, or any change in policy information, a hotspot server application 610 may communicate with a soft AP framework 620. The soft AP framework 620 may notify a client data controller 640 of an operation to be taken in association with the change in the policy information.

The client data controller 640 may generate external device-specific data rate, data limit, and time information based on connected external device identification information, and send the generated information to a traffic controller 630.

The traffic controller 630 may enable the external device-specific traffic control policies via a kernel 650.

Figure 7A:
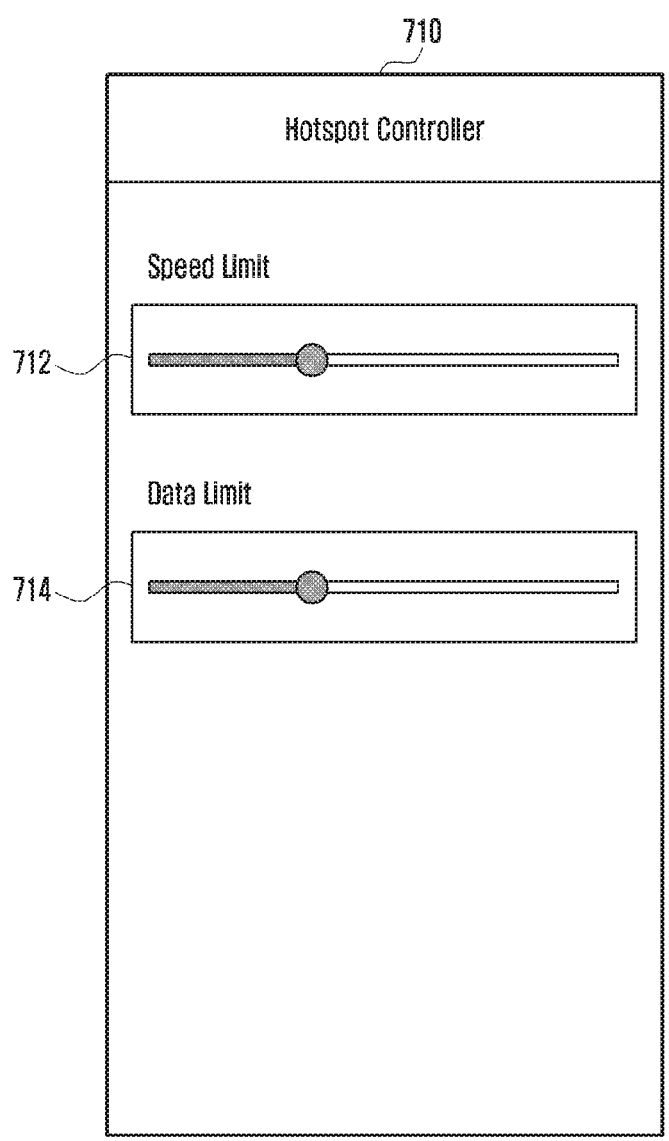
FIG. 7A is a diagram illustrating a screen display of a graphical user interface (GUI) for controlling a WLAN relay function, according to an embodiment.
Figure 7B:
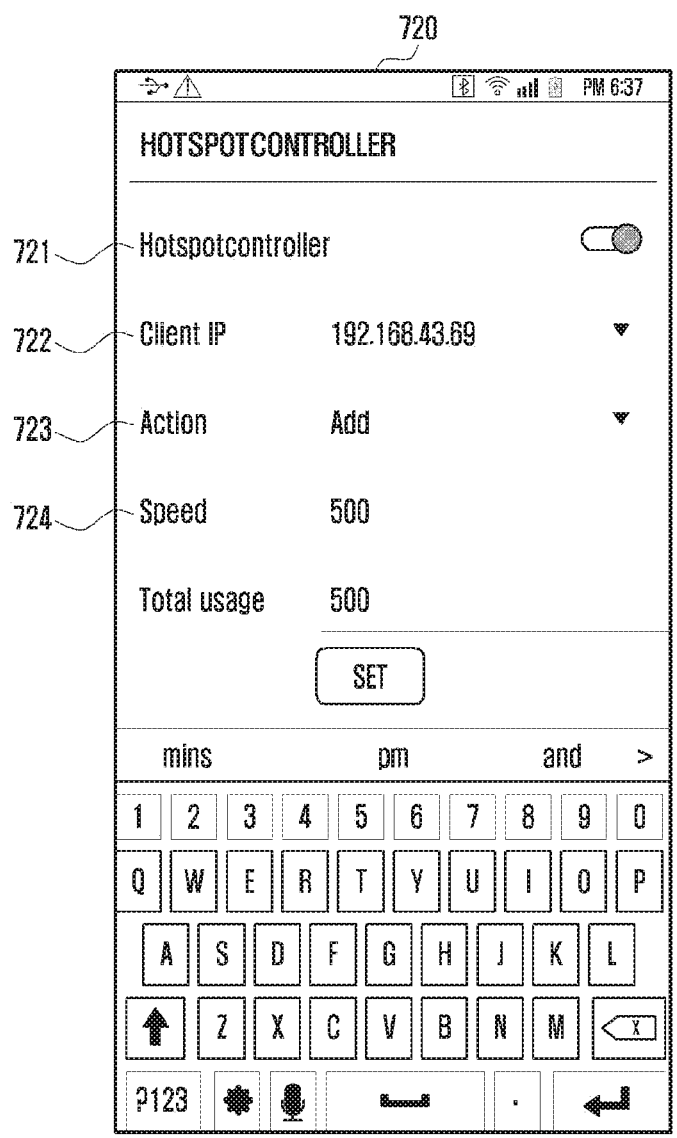
FIG. 7B is a diagram illustrating a screen display of a GUI for controlling a WLAN relay function, according to an embodiment.

FIGS. 7A and 7B are diagrams illustrating screen displays of a GUI for controlling a WLAN relay function, according to embodiments.

An electronic device may display a GUI for priority configuration and determine policy information including a priority order of the electronic device and at least one external device connected to the electronic device via a hotspot according to a user input made through the GUI.

With reference to FIG. 7A, a GUI 710 may provide a communication speed determination menu 712 and a maximum usage amount determination menu 714. If device-specific communication speeds and maximum usage amounts are determined according to a user input, the determination result is included in the policy information so as to be used by the electronic device in determining per-device bandwidths. The GUI 710 may be configured such that the menus as shown in FIG. 7A are provided per external device.

FIG. 7B shows another user interface 720 for receiving information on whether any external device is connected and a maximum communication speed. A hot spot controller toggle 721 enables or disables activation of the hotspot. If a connection request is received from an external device in a state in which a WLAN relay function is turned on, the electronic device displays an Internet Protocol (IP) address 722 of the external device and menus for determining whether to allow the connection and a maximum speed, as denoted by reference numbers 723 and 724.

Figure 8:
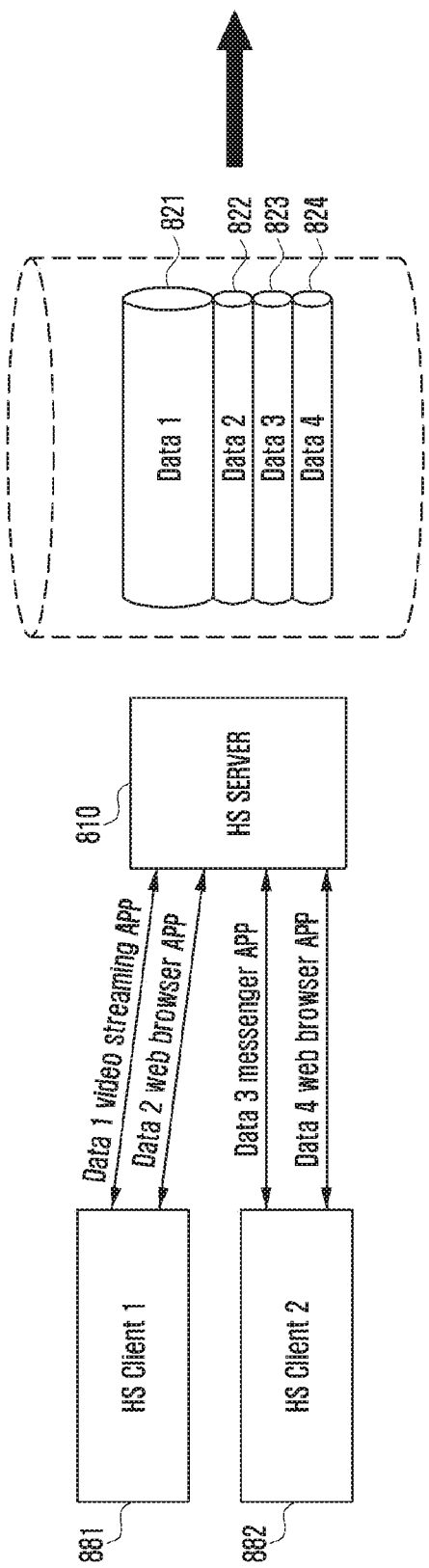
FIG. 8 is a diagram illustrating bandwidths allocated for application-specific data of applications running on an electronic device and an external device, according to an embodiment.

FIG. 8 is a diagram illustrating bandwidths allocated for application-specific data of applications running on an electronic device and an external device, according to an embodiment.

The electronic device may identify the applications associated with data being transmitted by itself and the at least one external device, and prioritize the electronic device and the at least one external device according to the priorities of the applications based on at least part of policy information.

A first client 881 may communicate data with a network via a video streaming application (data 1) and a web browser application (data 2), and a second client 882 may communicate data with the network via a messenger application (data 3) and a browser application (data 4). An electronic device 810 may identify the priorities of the applications (data 1, data 2, data 3, and data 4) based on the policy information and allocate, if the video streaming application (data 1) has the highest priority, a broad bandwidth 821 for the video streaming application (data 1), when compared with the bandwidths 822, 823, and 824 for data 2, data 3, and data 4.

Figure 9:
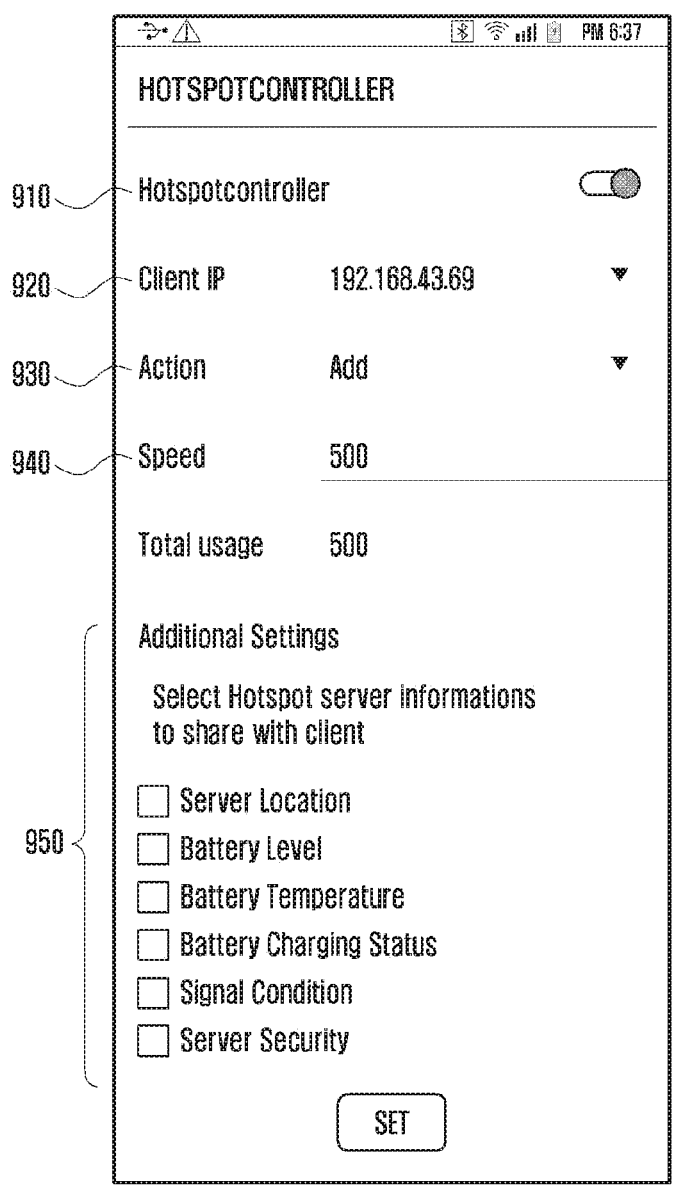
FIG. 9 is a diagram illustrating an exemplary screen display of a GUI for controlling a WLAN relay function, according to an embodiment.

FIG. 9 is a diagram illustrating an exemplary screen display of a GUI for controlling a WLAN relay function, according to an embodiment.

An electronic device may transmit its device information to an external device by means of a communication circuit (e.g., second communication circuit) and display a GUI for selecting information to be transmitted to the external device and/or functions to be provided.

The electronic device displays a hot spot controller toggle 721 enables or disables activation of the hotspot. Additionally, the electronic device displays an IP address 920 of the external device and a user interface for determining whether to allow a connection and maximum speed as denoted by reference numbers 930 and 940. The electronic device may also display a menu 950 for selecting information to be provided to the external device, such as, for example, an electronic device's location, battery level, battery temperature, battery charging status, signal strength, and security status. The electronic device may provide the external device with the information selected through the user interface as shown in the drawing.

Figure 10:
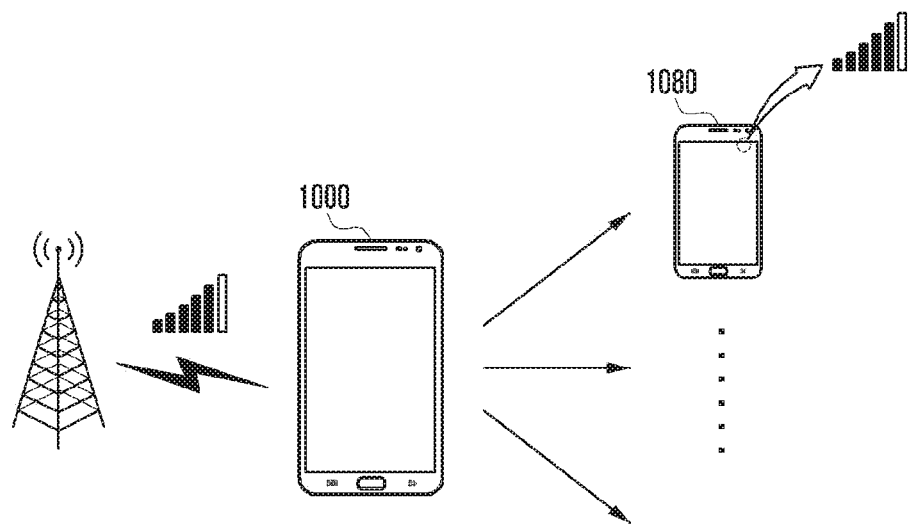
FIG. 10 is a diagram illustrating an operation of displaying a communication status of an electronic device at an external device, according to an embodiment.

FIG. 10 is a diagram illustrating an operation of displaying a communication status of an electronic device at an external device, according to an embodiment.

An electronic device 1000 may provide an external device 1080 with information on a cellular communication signal strength at the electronic device 1000. Although the external device 1080 is connected to the electronic device 1000 through a WLAN communication link, the data reception of the external device varies depending on the cellular communication signal strength at the electronic device 1000, which means that the data rate of traffic for the external device 1080 is low if the cellular communication signal strength between the electronic device 1000 and the network is low even though the WLAN communication signal strength between the electronic device 1000 and the external device 1080 is high. Accordingly, it is preferable for a processor of the electronic device 1000 to provide the external device 1080 with the information on the cellular communication signal strength at the electronic device 1000 in order for the external device 1080 to display the received information for notifying its user of the current data rate.

Alternatively, the processor may provide the external device 1080 with information on battery status (e.g., battery charging level, temperature, and charging progress) of the electronic device 1000. The external device 1080 may display the received information in order for the user to determine whether to maintain the hotspot connection to the electronic device 1000 and whether to use an application generating excessive data.

The processor may provide the external device 1080 with information on security-related functions (e.g., a firewall function, an antivirus function, a malware protection function, a ransomware protection function, a spyware protection function, and spam filters) installed in the electronic device 1000. For example, the processor may check data transmitted from the network to the external device for any virus and, if any virus is detected, execute an antiviral function to remove the virus from the data and transmit virus-free data to the external device.

The electronic device 300 may include at least one communication circuit 320 supporting WLAN communication and/or cellular communication and a processor 330 that is functionally connected to the at least one communication circuit 320. The processor 330 may establish a cellular communication connection with a network and a WLAN communication connection with at least one external device, check policy information for WLAN relay function information, and determine a bandwidth of at least one of the electronic device 300 and the at least one external device.

The policy information may include a priority of at least one of the electronic device 300 and the at least one external device.

The processor 330 may be configured to provide a GUI for configuring the priority and generate the policy information including the priority of at least one of the electronic device 300 and the at least one external device according to a user input made through the GUI.

The processor 330 may be configured to assign the highest priority to the electronic device 300.

The processor 330 may be configured to ascertain, if the bandwidth currently allocated to the electronic device 300 is narrower than a minimum bandwidth required for data transmission of the electronic device 300, an available bandwidth and reduce, if the available bandwidth is narrow than the bandwidth allocated to the at least one external device, the bandwidth allocated to the at least one external device.

The processor 330 may be configured to determine the priority of the at least one external device based on at least part of the policy information.

The processor 330 may be configured to determine cellular communication bandwidths to be allocated to the electronic device 300 and the at least one external electronic device based on at least part of the policy information.

The processor 330 may be configured to determine a WLAN communication bandwidth for the at least one external device based on at least part of the policy information.

The processor 330 may configured to identify applications related to the data being transmitted by the electronic device 300 and the at least one external device and prioritize the electronic device 300 and the at least one external device according to the priorities of the application based on at least part of the policy information.

The processor 330 may be configured to determine the policy information based on at least one of a current location or a current time.

The processor 330 may be configured to block, if a number of the at least one external device connected via the WLAN relay function is equal to or greater than a designated value, further connections of other external devices via the WLAN relay function based on at least part of the policy information.

The processor 330 may be configured to provide the at least one external device connected via the WLAN relay function with location information of the electronic device 300.

The processor 330 may be configured to provide the at least one external device connected via the WLAN relay function with information on the cellular communication signal strength.

The processor 330 may be configured to provide the at least one external device connected via the WLAN relay function with information on the battery status of the electronic device 300.

Figure 11:
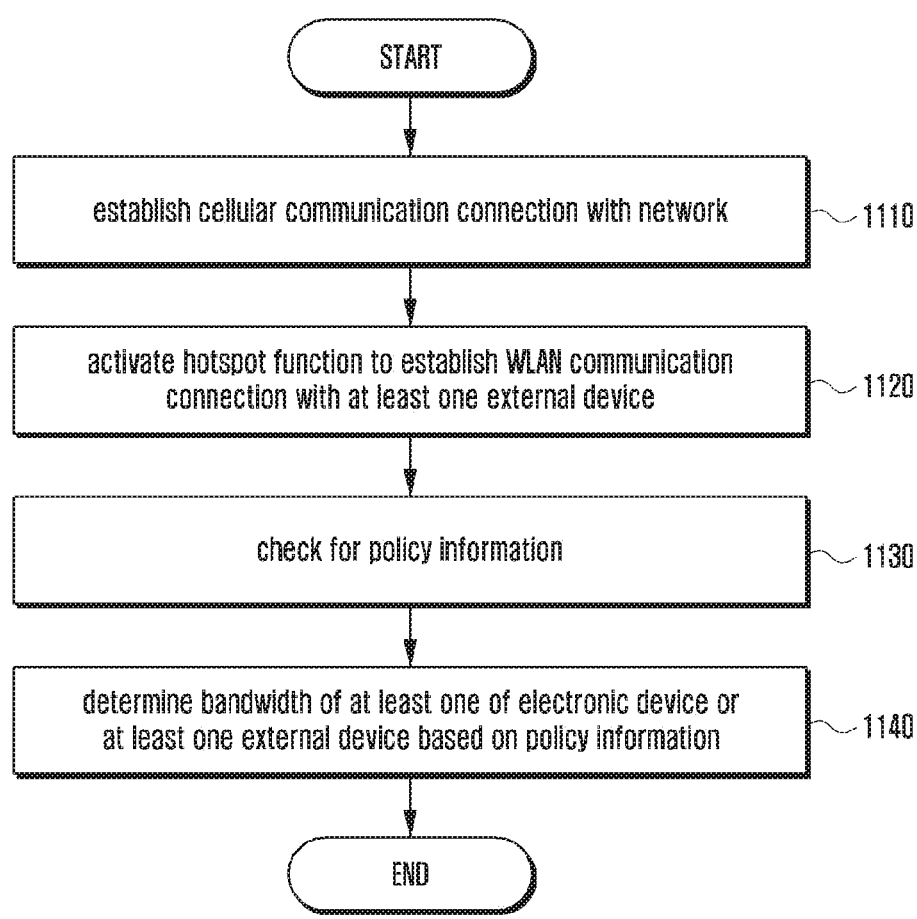
FIG. 11 is a flowchart illustrating a hotspot connection control method of an electronic device, according to an embodiment.

FIG. 11 is a flowchart illustrating a hotspot connection control method of an electronic device, according to an embodiment.

The procedure may be performed by the electronic device described with reference to FIGS. 1 to 10.

The electronic device 300 (e.g., processor 330 of FIG. 3) establishes a cellular communication connection with a network (e.g., the network 290 of FIG. 2), at step 1110. For example, the electronic device 300 may establish the cellular communication connection by means of at least one communication circuit (e.g., the communication circuit 320 of FIG. 3).

The electronic device 300 establishes a WLAN communication connection with at least one external device at step 1120. If a WLAN relay function is enabled, the electronic device 300 activates a component (e.g., communication circuit) for WLAN connection to establish a WLAN communication connection with the at least one external device.

The electronic device 300 checks for WLAN relay function-related policy information, at step 1130. The policy information may include a priority of at least one of the electronic device 300 or the at least one external device. The policy information may be generated based on a user input made through a GUI, configured autonomously through big data learning or according to a policy of an operator (e.g., communication operator) and stored at the manufacturing stage of the electronic device 300, or provided by an external server.

The electronic device 300 determines, at step 1140, bandwidths for the electronic device and the at least one external device connected to the electronic device via the WLAN relay function based on at least part of the policy information. The processor 330 may determine the bandwidths for the devices in consideration of a priority of at least one of the electronic device 300 or the at least one external device because the cellular communication bandwidth of the electronic device 300 is shared by traffic of the electronic device 300 and the at least one external device.

A WLAN relay connection control method of the electronic device 300 may include establishing a cellular communication connection between the electronic device and the network, establishing a WLAN communication connection between the electronic device and the at least one external device, checking for the WLAN relay function-related policy information, and determining a bandwidth for at least one of the electronic device 300 and the at least one external device based on at least part of the policy information.

The policy information may include a priority of at least one of the electronic device 300 and the at least one external device.

The method may further include providing a GUI for priority configuration and generating the policy information including the priority order of at least one of the electronic device 300 or the at least one external device according to a user input made through the GUI.

Checking for the policy information may include assigning the highest priority to the electronic device, and determining the bandwidth may include checking, if a current bandwidth allocated to the electronic device 300 is narrower than a minimum bandwidth required for data transmission of the electronic device 300, for an allocable bandwidth and reducing, if the allocable bandwidth is narrower than a bandwidth allocated to the at least one external device, the bandwidth allocated to the at least one external device.

Determining the bandwidth may include at least one of determining cellular communication bandwidths for the electronic device 300 and the at least one external device based on at least part of the policy information and determining WLAN communication bandwidths for the electronic device 300 and the at least one external device based on at least part of the policy information.

Checking for the policy information may include identifying applications related to data being transmitted by the electronic device 300 and the at least one external device and prioritizing the electronic device 300 and the at least one external device according to priorities of the applications based on at least part of the policy information.

Checking for the policy information includes determining the policy information based on at least one of a current location or a current time of the electronic device 300.

As described above, the electronic device and its WLAN relay function control method of the disclosure is advantageous in terms of guaranteeing data usages and data rates of both the electronic device as a relay host and electronic devices as relay clients connected to the relay host.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:
   at least one communication circuit supporting wireless local area network (WLAN) communication and cellular communication; and
   a processor functionally connected to the at least one communication circuit and configured to:
   establish a cellular communication connection between the electronic device and a network;
   establish a WLAN communication connection between the electronic device and an external device via a WLAN relay function of the electronic device;
   check for policy information related to the WLAN relay function;
   determine a bandwidth between the electronic device and the network, through which bandwidth data is relayed via the WLAN relay function of the electronic device, based on at least part of the policy information, and
   block WLAN relay connections of additional external devices based on a number of the external device connected to the electronic device via the WLAN relay function and the at least part of the policy information.

2. The electronic device of claim 1, wherein the policy information comprises a priority of at least one of the electronic device and the external device.

3. The electronic device of claim 2, wherein the processor is further configured to provide a graphic user interface (GUI) for configuring the priority and determine the policy information including the priority according to a user input made through the GUI.

4. The electronic device of claim 2, wherein the processor is further configured to assign a highest priority to the electronic device.

5. The electronic device of claim 4, wherein the processor is further configured to check for an allocable bandwidth based on a current bandwidth allocated to the electronic device being narrower than a minimum bandwidth required for data transmission of the electronic device, and determine the second bandwidth by reducing the bandwidth allocated to the external device based on the allocable bandwidth being narrower than the bandwidth allocated to the at least one external device.

6. The electronic device of claim 2, wherein the processor is further configured to:
   establish WLAN communication connections between the electronic device and a plurality of external devices via the WLAN relay function; and
   prioritize the plurality of external devices based on the at least part of the policy information.

7. The electronic device of claim 1, wherein the processor is further configured to determine cellular communication bandwidths to be allocated to the electronic device and the external device based on the at least part of the policy information.

8. The electronic device of claim 1, wherein the processor is further configured to determine WLAN communication bandwidths to be allocated to the electronic device and the external device based on the at least part of the policy information.

9. The electronic device of claim 1, wherein the processor is further configured to identify applications related to data being transmitted by the electronic device and the external device, and determine priorities of the electronic device and the external device according to priorities of the applications based on the at least part of the policy information.

10. The electronic device of claim 1, wherein the processor is further configured to provide the external device connected to the electronic device via the WLAN relay function with location information of the electronic device.

11. The electronic device of claim 1, wherein the processor is further configured to provide the external device connected to the electronic device via the WLAN relay function with information on cellular communication signal strength.

12. The electronic device of claim 1, wherein the processor is further configured to provide the external device connected to the electronic device via the WLAN relay function with information on a battery status of the electronic device.

13. A wireless local area network (WLAN) relay connection control method of an electronic device, the method comprising:
    establishing a cellular communication connection between the electronic device and a network;
    establishing a WLAN communication connection between the electronic device and an external device via a WLAN relay function of the electronic device;
    checking for policy information related to the WLAN relay function;
    determining a bandwidth between the electronic device and the network, through which bandwidth data is relayed via the WLAN relay function of the electronic device, based on at least part of the policy information; and
    blocking WLAN relay connections of additional external devices based on a number of the external device connected to the electronic device via the WLAN relay function and the at least part of the policy information.

14. The method of claim 13, wherein the policy information comprises a priority of at least one of the electronic device and the external device.

15. The method of claim 14, further comprising:
    providing a graphic user interface (GUI) for configuring the priority; and
    determining the policy information including the priority according to a user input made through the GUI.

16. The method of claim 14, wherein checking for policy information comprises assigning a highest priority to the electronic device, and wherein determining the bandwidth comprises:
    checking for an allocable bandwidth based on a current bandwidth allocated to the electronic device being narrower than a minimum bandwidth required for data transmission of the electronic device; and
    determining the second bandwidth by reducing the bandwidth allocated to the external device based on the allocable bandwidth being narrower than the bandwidth allocated to the external device.

17. The method of claim 13, wherein determining the bandwidth comprises at least one of:
    determining cellular communication bandwidths to be allocated to the electronic device and the external device based on the at least part of the policy information; or
    determining wireless local communication network communication bandwidths to be allocated to the electronic device and the external device based on the at least part of the policy information.

18. The method of claim 13, wherein checking for the policy information comprises:
    identifying applications related to data being transmitted by the electronic device and the external device; and
    determining priorities of the electronic device and the external device according to priorities of the applications based on the at least part of the policy information.

19. The method of claim 13, wherein checking for the policy information comprises determining the policy information based on at least one of a current location or a current time of the electronic device.

* * * * *